US006993235B2

(12) United States Patent
Takagi et al.

(10) Patent No.: US 6,993,235 B2
(45) Date of Patent: Jan. 31, 2006

(54) THREE-DIMENSIONAL PERIODIC STRUCTURE AND FUNCTIONAL ELEMENT INCLUDING THE SAME

(75) Inventors: Akinari Takagi, Utsunomiya (JP); Kiyokatsu Ikemoto, Utsunomiya (JP); Hikaru Hoshi, Utsunomiya (JP)

(73) Assignee: Canon Kabushiki Kaisha, Ohta-Ku (JP)

( * ) Notice: Subject to any disclaimer, the term of this patent is extended or adjusted under 35 U.S.C. 154(b) by 0 days.

(21) Appl. No.: 11/062,157

(22) Filed: Feb. 18, 2005

(65) Prior Publication Data

US 2005/0207717 A1  Sep. 22, 2005

(30) Foreign Application Priority Data

Feb. 23, 2004  (JP)  .............................. 2004-046454
Jul. 26, 2004  (JP)  .............................. 2004-217365
Jan. 25, 2005  (JP)  .............................. 2005-016792

(51) Int. Cl.
*G02B 6/10*  (2006.01)
*G02B 6/12*  (2006.01)

(52) U.S. Cl. .................. 385/129; 385/131; 385/132; 385/14; 385/146

(58) Field of Classification Search ............... None
See application file for complete search history.

(56) References Cited

U.S. PATENT DOCUMENTS

| 5,335,240 A | 8/1994 | Ho et al. |
| 5,600,483 A | 2/1997 | Fan |
| 5,998,298 A * | 12/1999 | Fleming et al. ............. 438/692 |
| 6,134,043 A | 10/2000 | Johnson et al. |
| 6,392,787 B1 | 5/2002 | Cirelli et al. |
| 6,521,136 B1 * | 2/2003 | Sfez et al. ..................... 216/24 |
| 6,690,876 B2 * | 2/2004 | Sigalas ........................ 385/146 |
| 2003/0104700 A1 | 6/2003 | Fleming |
| 2005/0150864 A1 * | 7/2005 | Stasiak et al. ................. 216/41 |

OTHER PUBLICATIONS

Physical Review Letters, vol. 58, pp. 2059, 1987 (Entire document).
Applied Physics Letters, vol. 84, No. 3, pp. 362, 2004 (Entire document).
Alexander Feigel, et al., "Overlapped Woodpile Photonic Crystals", Applied Optics, vol. 43, No. 4, pp 793-795 XP-002326290, Feb. 1, 2004.

* cited by examiner

*Primary Examiner*—John D. Lee
*Assistant Examiner*—Omar Rojas
(74) *Attorney, Agent, or Firm*—Canon U.S.A. Inc I.P. Division

(57) ABSTRACT

A three-dimensional periodic structure exhibiting a complete photonic band gap in a wide wavelength range and being readily produced, as well as a functional element including the same, is provided. In the three-dimensional periodic structure exhibiting a photonic band gap according to the present invention, layers composed of a plurality of columnar structures spaced at predetermined intervals are stacked sequentially with additional layers therebetween. Discrete structures contained in the additional layers are disposed at the positions corresponding to the intersections of the columnar structures, and the area of the discrete structure is larger than the area of the intersection region of the above-described columnar structures.

14 Claims, 14 Drawing Sheets

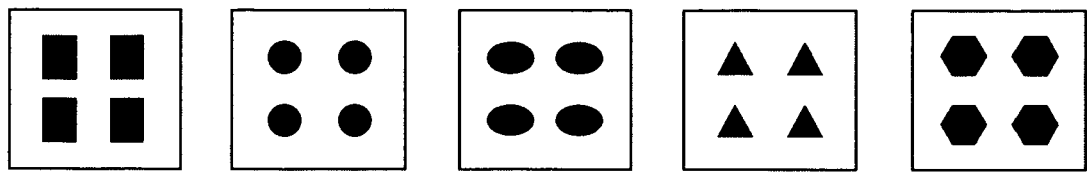
FIG. 4A  FIG. 4B  FIG. 4C  FIG. 4D  FIG. 4E
FIG. 5A
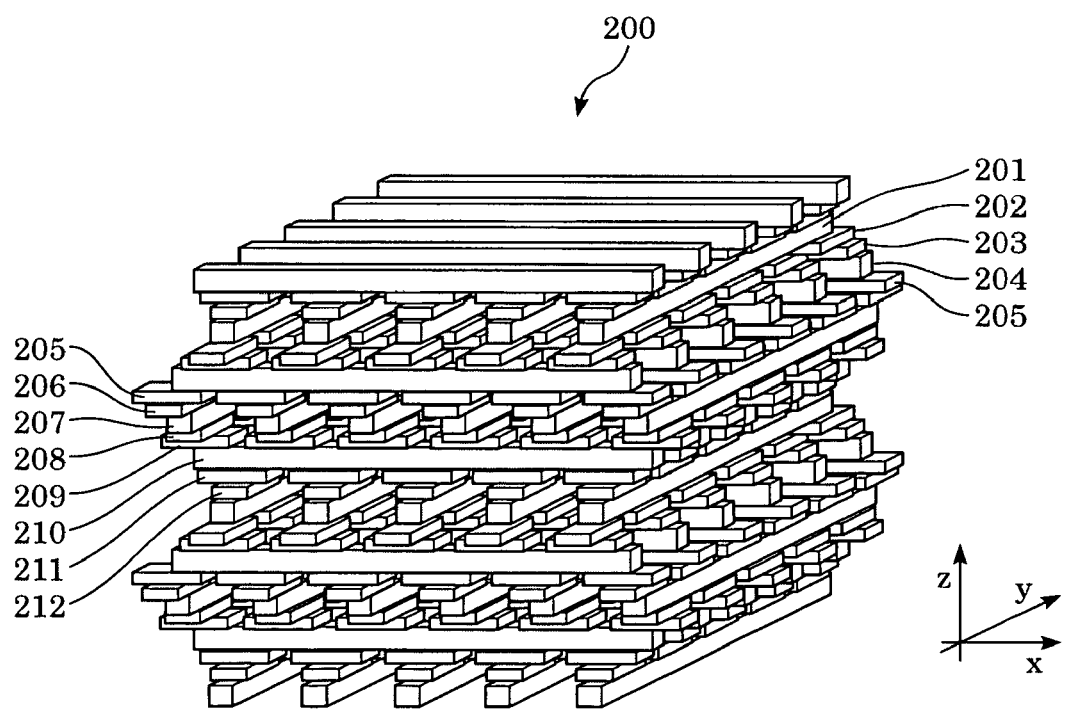

FIG. 9A
FIG. 9B
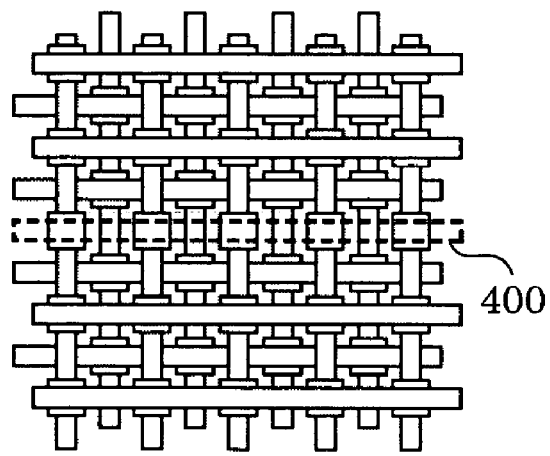
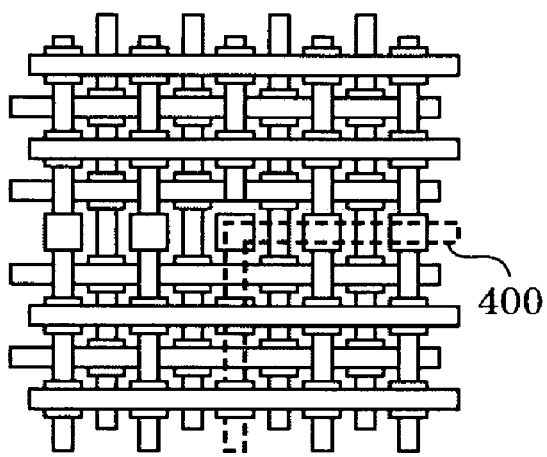
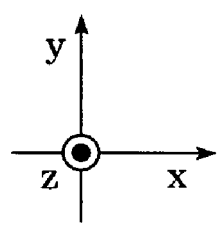

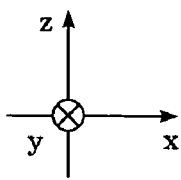
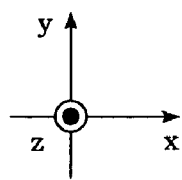
FIG. 11A  FIG. 11B  FIG. 11C
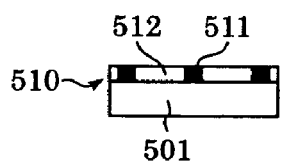
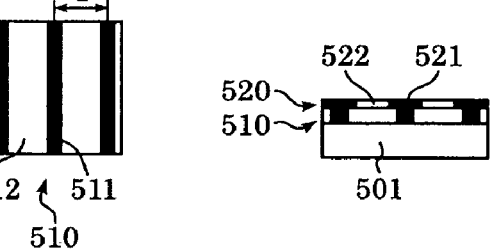
FIG. 11D  FIG. 11E  FIG. 11F
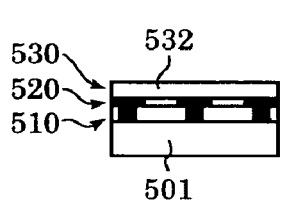
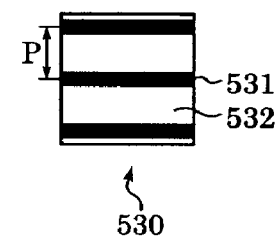
FIG. 11G  FIG. 11H  FIG. 11I
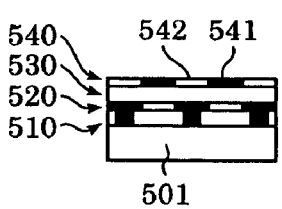
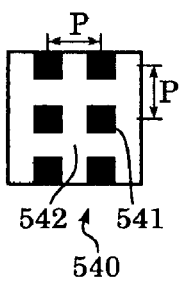
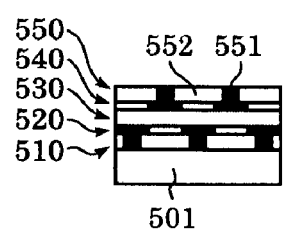
FIG. 11J  FIG. 11K
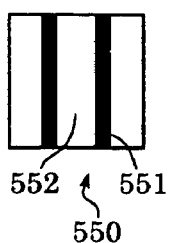
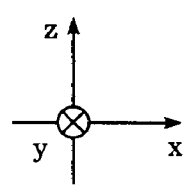
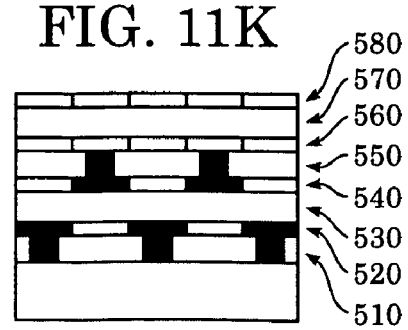

DIAMOND OPAL STRUCTURE

WOODPILE STRUCTURE

SPECIFIC
THREE-DIMENSIONAL
STRUCTURE

HELICAL STRUCTURE

INVERSE STRUCTURE

DIAMOND WOODPILE
STRUCTURE

THREE-DIMENSIONAL PERIODIC STRUCTURE AND FUNCTIONAL ELEMENT INCLUDING THE SAME

BACKGROUND OF THE INVENTION

1. Field of the Invention

The present invention relates to a three-dimensional periodic structure exhibiting a photonic band gap, and a functional element, e.g., a filter, a light-emitting device, or an optical circuit, including the same.

2. Description of the Related Art

The concept that the transmission-reflection characteristics and the like of electromagnetic waves are controlled by a structure that is smaller than or equal to a wavelength of light has been previously proposed by Yablonovitch (Physical Review Letters, Vol. 58, pp. 2059, 1987). According to this document, the transmission-reflection characteristics and the like of electromagnetic waves can be controlled by periodically arranging structures smaller than or equal to the wavelength of light, and the transmission-reflection characteristics of light can be controlled by reducing the wavelength of the electromagnetic waves to an order of the wavelength of the light. Such a structure is known as a photonic crystal, and it is indicated that a reflecting mirror having a reflectance of 100% and exhibiting no optical loss can be realized at some wavelength range. The above-described concept that the reflectance of 100% can be achieved at some wavelength range is referred to as a photonic band gap in contradistinction to an energy gap of a known semiconductor. The photonic band gap can be realized relative to light incident from every direction by making the structure a fine three-dimensional periodic structure. Hereafter, this is referred to as a complete photonic band gap. When the complete photonic band gap can be realized, various applications can be performed, for example, spontaneous emission from a light-emitting device can be reduced. Therefore, unprecedented and new functional elements can be realized. Furthermore, there is a demand for a functional element having a structure suitable for realizing a complete photonic band gap in a wider wavelength range.

Some structures exhibiting the above-described photonic band gap have been proposed (e.g., U.S. Pat. No. 6,392,787, U.S. Pat. No. 6,134,043, and Applied Physics Letters, Vol. 84, No. 3, pp. 362, 2004). Examples of three-dimensional periodic structures capable of realizing a complete photonic band gap include a diamond opal structure, a woodpile structure, a helical structure, a specific three-dimensional periodic structure, a structure realized by inverting the above-described three-dimensional periodic structure (an inverse structure), and a diamond woodpile structure, shown in FIGS. 12A to 12F in that order.

In general, three-dimensional periodic structures exhibiting photonic band gaps have structures that are small and are not readily producible. Consequently, very few three-dimensional periodic structures are operated in light wave ranges (wavelength of a few micrometers or less in a vacuum).

Under such circumstances, the woodpile structure shown in FIG. 12B proposed in U.S. Pat. No. 5,335,240 is a structure which can be produced by stacking two-dimensional periodic structures. Therefore, among three-dimensional structures, the woodpile structure is the only one structure in which a photonic band gap has been experimentally observed. However, the woodpile structure has a small photonic band gap width as compared to an inverse opal structure which is believed to have the largest wavelength width of photonic band gap. Consequently, there is a problem in that realization of optical elements, e.g., waveguides and wavelength selection filters, which are operated in wide wavelength bands, are difficult. The diamond woodpile structure shown in FIG. 12F, proposed in Applied Physics Letters, Vol. 84, No. 3, pp. 362, 2004, is a structure in which square prisms are disposed between square columns, the square prism having a square bottom and a side length equal to the width of the square column. The diamond woodpile structure exhibits a photonic band gap slightly wider than that of the woodpile structure, although the difference therebetween is small. On the other hand, it is difficult to produce the inverse opal structure by a technique used for a known semiconductor production process.

SUMMARY OF THE INVENTION

The present invention is directed to a three-dimensional periodic structure exhibiting a photonic band gap, a functional element incorporating the three-dimensional periodic structure, and a light-emitting device incorporating said functional element. A three-dimensional periodic structure according to an aspect of the present invention exhibits a photonic band gap and includes a first layer including a plurality of columnar structures spaced apart by a predetermined interval; a second layer including a plurality of columnar structures spaced apart by a predetermined interval, the columnar structures extending in a direction different from that of the above-described columnar structures in the first layer; a third layer including a plurality of columnar structures spaced apart by a predetermined interval, the columnar structures extending in the same direction as that of the above-described columnar structures in the first layer; a fourth layer including a plurality of columnar structures spaced apart by a predetermined interval, the columnar structures extending in the same direction as that of the above-described columnar structures in the second layer; and additional layers, each including one layer containing discrete structures disposed discretely in a plane parallel to each of the four layers, wherein the first layer to the fourth layer are stacked sequentially with the additional layer between the individual layers, the first layer and the third layer are stacked such that the columnar structures contained in the two layers mutually shift by one-half the above-described predetermined interval in a direction perpendicular to the direction of the extension of the columnar structures, the second layer and the fourth layer are stacked such that the columnar structures contained in the two layers mutually shift by one-half the above-described predetermined interval in a direction perpendicular to the direction of the extension of the columnar structures, discrete structures contained in the additional layers are disposed at the positions corresponding to the intersections of the columnar structures, and an area of the discrete structure in the plane parallel to each of the four layers is larger than an area of the intersection of the columnar structures. A three-dimensional periodic structure according to an aspect of the present invention exhibits a photonic band gap and includes a first layer including a plurality of columnar structures spaced apart by a predetermined interval; a second layer including a plurality of columnar structures spaced apart by a predetermined interval, the columnar structures extending in a direction different from that of the columnar structures in the first layer; a third layer including a plurality of columnar structures spaced apart by a predetermined interval, the columnar structures extending in the same direction as that of the columnar structures in the first layer; a fourth layer including a plurality of columnar structures spaced apart by a predetermined interval, the columnar structures extending in the same direction as that of the columnar structures in the second layer; and additional layers, each including at least two layers containing discrete structures disposed discretely in a plane parallel to each of the four layers, wherein the first layer to the fourth layer are stacked sequentially with the additional layer between the individual layers, the first layer and the third layer are stacked such that the columnar structures contained in the two layers mutually shift by one-half the predetermined interval in a direction perpendicular to the direction of the extension of the columnar structures, the second layer and the fourth layer are stacked such that the columnar structures contained in the two layers mutually shift by one-half the predetermined interval in a direction perpendicular to the direction of the extension of the columnar structures, and discrete structures contained in the additional layers are disposed at the positions corresponding to the intersections of the columnar structures.

In yet another aspect of the present invention, a functional element comprising a structure in which a plurality of the above described three-dimensional periodic structures are stacked, wherein the structure comprises a linear defect portion, and the linear defect portion functions as a waveguide. In yet still another aspect of the present invention, a functional element comprising a structure in which a plurality of the above described three-dimensional periodic structures are stacked, wherein the structure comprises a point defect portion, and the point defect portion functions as a resonator.

In yet still another aspect of the present invention, a light-emitting device includes the above-described functional element having the point defect portion, an active medium capable of emitting light and disposed in the point defect portion, and an excitation component configured to excite the active medium.

According to the present invention, a three-dimensional periodic structure exhibiting a complete photonic band gap in a wide wavelength band as compared with that in the known three-dimensional periodic structure and being readily manufactured is provided. A functional element which is operated in a wider wavelength band can be realized by constructing the functional element including the three-dimensional periodic structure of the present invention. Furthermore, high-performance microcircuits can be realized by combining various functional elements.

Further features and advantages of the present invention will become apparent from the following description of exemplary embodiments with reference to the attached drawings.

BRIEF DESCRIPTION OF THE DRAWINGS

FIGS. 4A to 4E are explanatory diagrams of sectional shapes of a plurality of structures according to the present invention.

FIG. 5A is a perspective view of a key portion of a second embodiment of the present invention.

FIGS. 9A and 9B are schematic diagrams of key portions of a fourth embodiment of the present invention.

FIGS. 11A to 11K are explanatory diagrams of a method for producing a three-dimensional periodic structure of a fifth embodiment of the present invention.

FIG. 12A shows a diamond opal structure, FIG. 12B shows a woodpile structure, FIG. 12C shows a helical structure, FIG. 12D shows a specific three-dimensional structure, FIG. 12E shows an inverse structure, and FIG. 12F shows a diamond woodpile structure.

DESCRIPTION OF THE EMBODIMENTS

First Embodiment

Figure 1A:
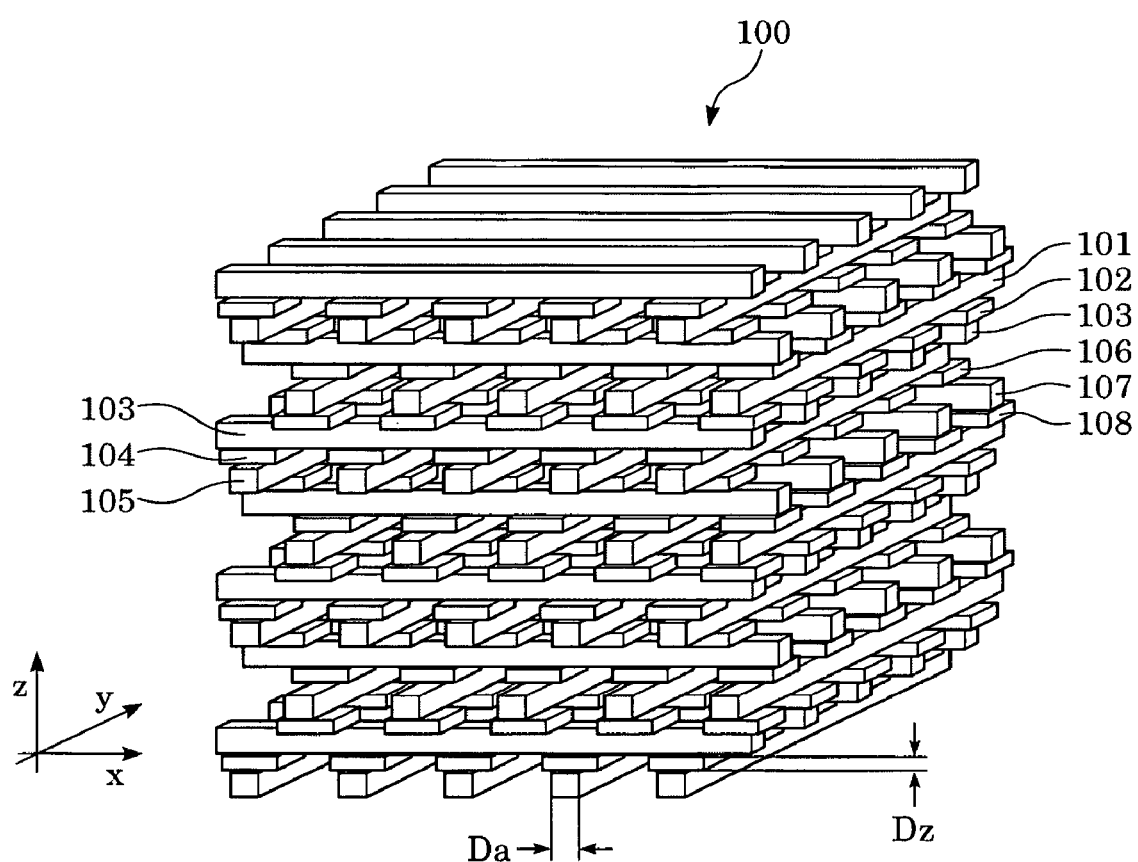
FIG. 1A is a perspective view of a key portion of a first embodiment of the present invention.
Figure 1B:
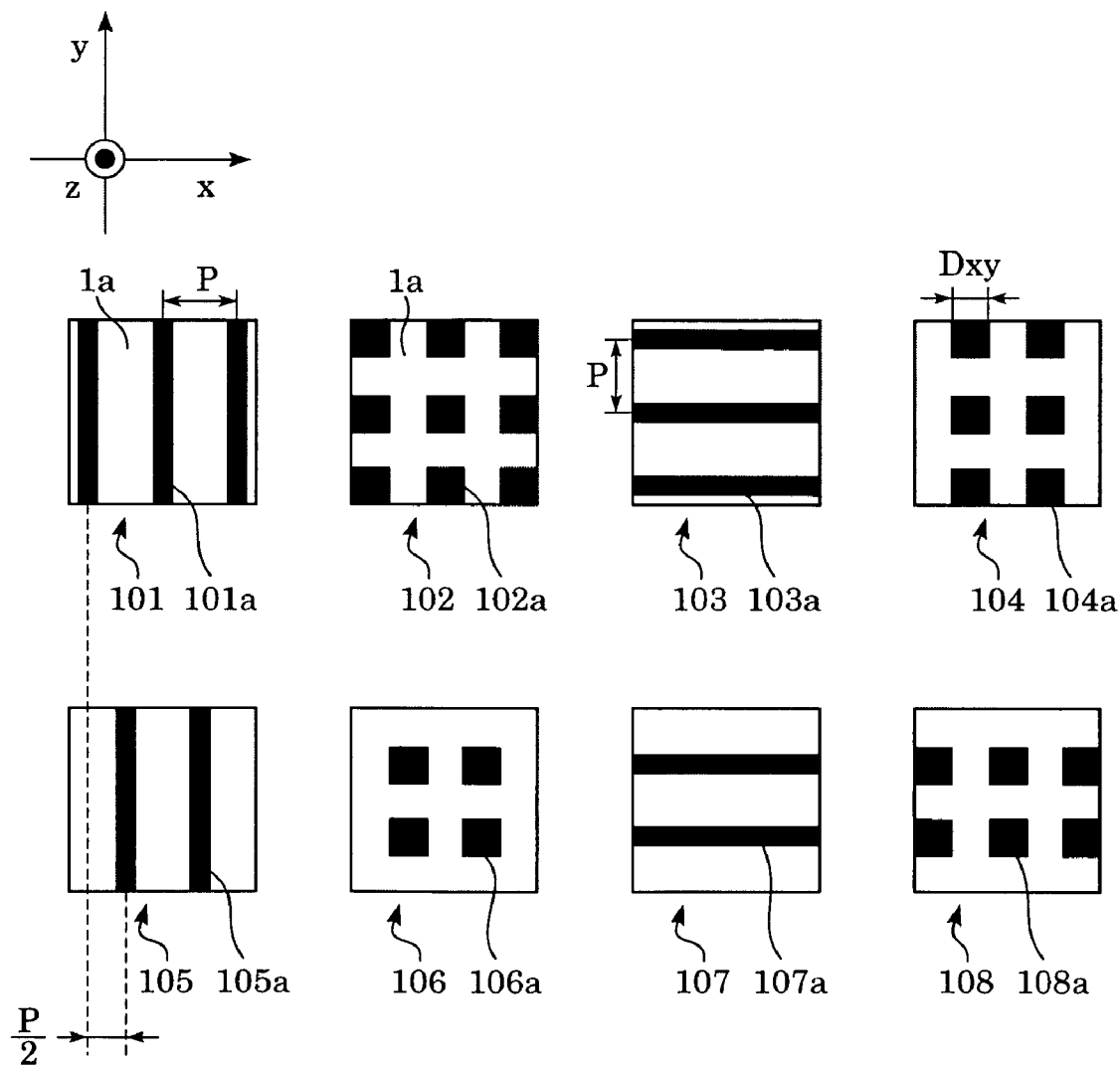
FIG. 1B is an x-y sectional view of each layer shown in FIG. 1A.

FIG. 1A is a perspective view of a key portion of a three-dimensional periodic structure in accordance with a first embodiment of the present invention. The three-dimensional periodic structure 100 includes eight layers 101 to 108 in x-y planes as a basic period. FIG. 1B is a schematic diagram showing a part of an x-y section of each of the layers 101 to 108. In the first layer 101 and the fifth layer 105, a plurality of columnar structures 101a and 105a made of a first medium (high refractive index) extending in the y axis (first axis) direction are spaced at regular intervals (pitches) P in the x direction, and the columnar structures 101a and 105a are arranged at positions shifted from each other by P/2 in the x axis direction. In the third layer 103 and the seventh layer 107, a plurality of columnar structures 103a and 107a made of the first medium extending in the x axis (second axis) direction are spaced at regular intervals (pitches) P in the y direction, and the columnar structures 103a and 107a are arranged at positions shifted from each other by P/2 in the y axis direction.

In the second layer (additional layer) 102, discrete structures 102a made of the first medium are disposed discretely at positions corresponding to the intersections of the columnar structures 101a in the first layer 101 and the columnar structures 103a in the third layer 103 such that the discrete structures do not contact with each other in the x-y plane. Here, the area of the discrete structure 102a in the x-y plane is larger than the area of the intersection region of the columnar structure 101a in the first layer 101 and the columnar structure 103a in the third layer 103.

Likewise, in the fourth layer (additional layer) 104, the sixth layer (additional layer) 106, and the eighth layer (additional layer) 108, each located between the layers containing the columnar structures, discrete structures 104a, 106a, and 108a made of the first medium and having the same shape as the shape of the discrete structure 102a are disposed discretely in x-y planes at positions corresponding to the intersections of the columnar structures in the adjacent layers.

The columnar structures 101a, 103a, 105a, and 107a in the respective layers are in contact with the discrete structures 102a, 104a, 106a, and 108a in the adjacent layers. In each layer, regions other than the columnar structures and portions 1a other than the discrete structures are filled in with a second medium (low refractive index). In the present embodiment, the refractive indices of the first and the second media, shapes and intervals of the columnar structures and the discrete structures, the thickness of each layer, and the like are optimized such that a complete photonic band gap (wavelength range in which the reflectance is substantially 100% in every direction) in a very wide frequency band (wavelength band) is realized in a desired frequency range (wavelength range).

Figure 2:
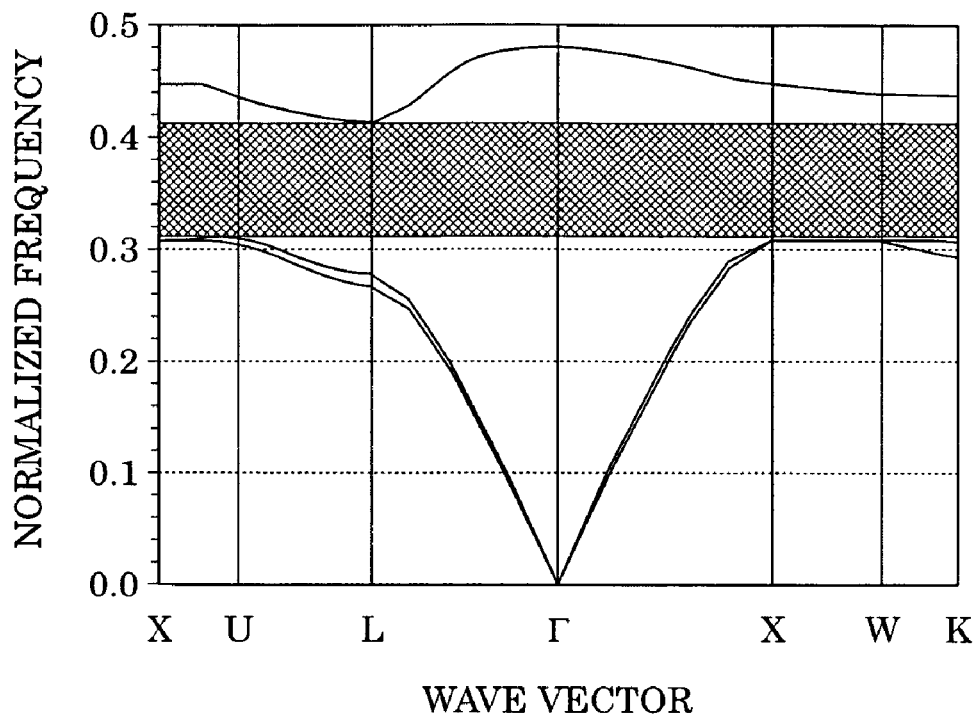
FIG. 2 is an explanatory diagram of a photonic band structure of the first embodiment of the present invention.

For example, FIG. 2 shows the result of analysis of a photonic band structure by using a plane-wave expansion method, where the refractive index of the first medium is assumed to be 4, the refractive index of the second medium is assumed to be 1, the intervals of the columnar structures 101a, 103a, 105a, and 107a are assumed to be P, the thickness in the z axis direction of every layer containing the columnar structures is assumed to be 0.23×P, the thickness in the z axis direction of each of the layers 102, 104, 106, and 108 containing the discrete structures 102a, 104a, 106a, and 108a, respectively, is assumed to be 0.123×P, every columnar structure is assumed to be a square prism having a section side length Da of 0.23×P, and every discrete structure is assumed to be a rectangular parallelepiped having a thickness Dz in the z axis direction of 0.123×P with a square x-y section having a side length Dxy of 0.48×P.

In the configuration shown in FIG. 1A, rectangular parallelepipeds sandwiched by square columns contained in different layers are disposed at positions corresponding to lattice positions of the diamond lattice. In particular, when the above-described configuration is adopted, the diamond lattice constructed by the rectangular parallelepipeds becomes cubic.

The application of the plane-wave expansion method to a photonic crystal is also described in Physical Review Letters, Vol. 65, pp. 3152, 1990, "Existence of a photonic gap in periodic dielectric structures".

In FIG. 2, the horizontal axis represents a wave vector, that is, an incident direction of an electromagnetic wave incident on the photonic crystal. For example, a point K represents a wave vector parallel to the x axis (or y axis), and a point X represents a wave vector having an inclination of 45° relative to the x axis (or y axis) in an x-y plane. On the other hand, the vertical axis represents a frequency (normalized frequency) normalized by the lattice period. In the normalized frequencies indicated by cross-hatching in FIG. 2, no light can be present regardless of the incident direction of light, and a complete photonic band gap is constructed. In this structure, the complete photonic band gap ratio $\Delta\omega/\omega 0$ determined by normalizing the complete photonic band gap (normalized) frequency band width $\Delta\omega$ with the complete photonic band gap (normalized) center frequency $\omega 0$ becomes about 0.281.

Figure 3A:
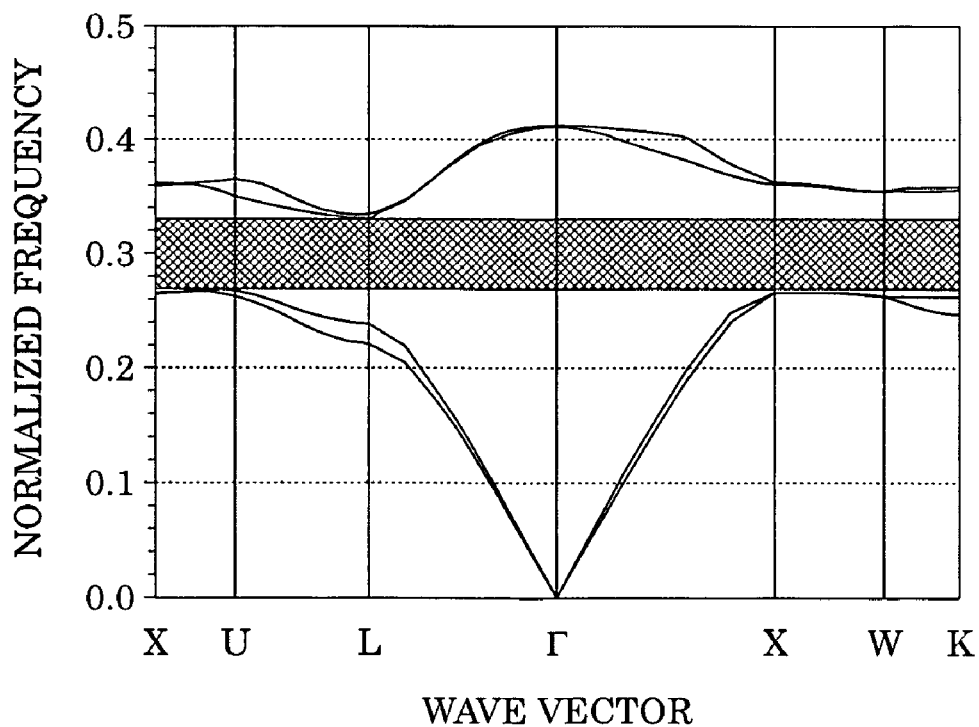
FIG. 3A is an explanatory diagram of a photonic band structure of a woodpile structure.

FIG. 3A shows a photonic band diagram of a woodpile structure including media having the same refractive indices as those in the above-described embodiment (the refractive index of the medium of the square column is 4, and the refractive index of the medium of the portion other than the square column is 1), according to a known technology. In the woodpile structure used for the comparison, the width L1 and the height L2 in the z direction of the square column are specified to be those indicated by Formula 1, where the interval between the square columns in each layer is set at P.

$$L1 = L2 = \frac{\sqrt{2}}{4}P \qquad \text{Formula 1}$$

When L1 and L2 are specified by Formula 1, the positions of intersections of square columns contained in adjacent layers in the woodpile structure are made to correspond to the lattice positions of the diamond opal structure of a cube.

Figure 3B:
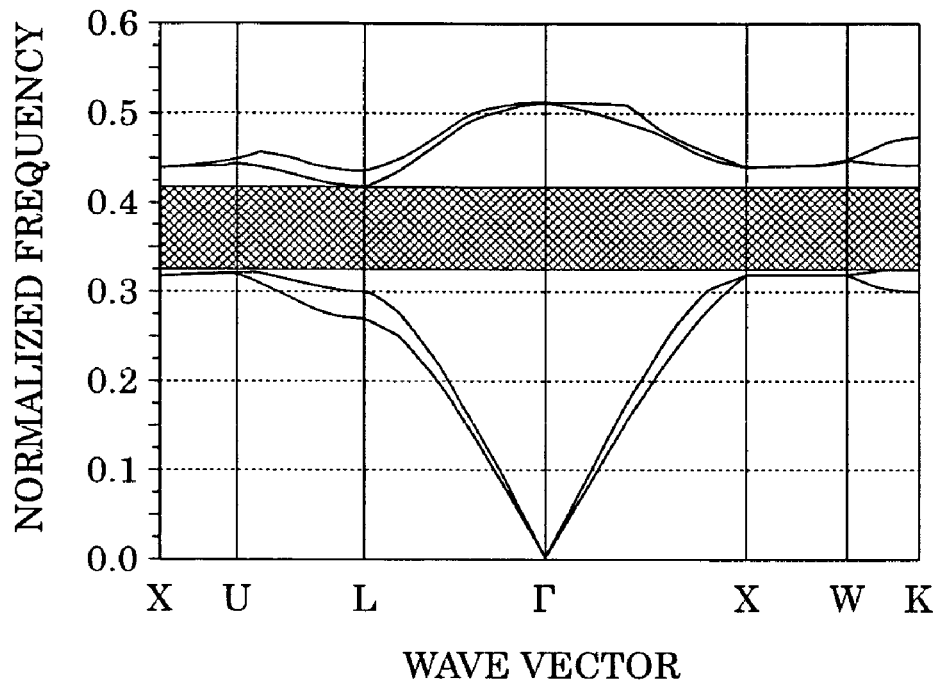
FIG. 3B is an explanatory diagram of a photonic band structure of a woodpile structure.

The complete photonic band gap ratio $\Delta\omega/\omega 0$ in the photonic band diagram shown in FIG. 3A is about 0.212. Therefore, it is clear that the resulting complete photonic band gap is significantly narrower as compared with that of the structure according to the present invention. FIG. 3B shows a photonic band diagram in the case where L1 and L2 are represented by Formula 2.

$$L1=0.25\times P, L2=0.3\times P \qquad \text{Formula 2}$$

When L1 and L2 are specified by Formula 2, the positions of intersections of square columns contained in adjacent layers in the woodpile structure are made to correspond to the lattice positions of the diamond opal structure of a rectangular parallelepiped.

The complete photonic band gap ratio $\Delta\omega/\omega 0$ in the photonic band diagram shown in FIG. 3B is 0.263. Therefore, it is clear that the resulting complete photonic band gap is narrower as compared with that of the structure according to the present invention.

Figure 3C:
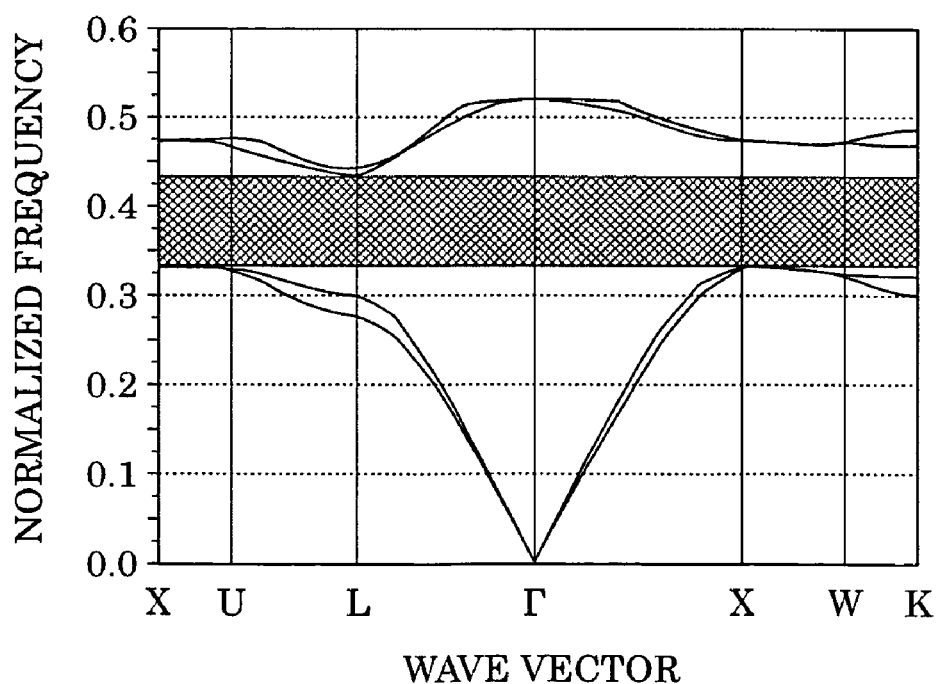
FIG. 3C is an explanatory diagram of a photonic band structure of a diamond woodpile structure.

FIG. 3C shows a photonic band diagram of a diamond woodpile structure including media having the same refractive indices as those in the above-described embodiment (the refractive index of the medium of the square column is 4, and the refractive index of the medium of the portion other than the square column is 1), according to a known technology. In the diamond woodpile structure used for the comparison, the width in the x or y direction of every square column is assumed to be 0.28×P, the height in the z direction is assumed to be 0.22×P, and the height in the z direction of a square prism disposed between the square columns and having the same width (0.28×P) as the width of the square column is assumed to be 0.13×P, where the interval between the square columns in each layer is set at P. The complete photonic band gap ratio $\Delta\omega/\omega 0$ in the photonic band diagram shown in FIG. 3C is about 0.274. Therefore, it is clear that the resulting complete photonic band gap is narrower as compared with that of the structure according to the present invention.

The reason a wide complete photonic band gap ($\Delta\omega/\omega 0=0.281$) is realized according to the three-dimensional periodic structure 100 of the present embodiment as compared with the known woodpile structure ($\Delta\omega/\omega 0=0.263$) and the diamond woodpile structure ($\Delta\omega/\omega 0=0.274$) will be described below. In the three-dimensional periodic structure 100, layers 102, 104, 106, and 108 containing discrete structures at the positions corresponding to the intersections of the columnar structures are added, and the discrete structure has an area larger than the area of the intersection of the columnar structures in an x-y plane. Consequently, structural portions joined in the z direction in FIG. 1A are incorporated into the woodpile structure. Since the discrete structures have areas larger than the areas of the intersections of the columnar structures, portions joined in a slanting direction (for example, a diagonal direction of x-z) are incorporated into the diamond woodpile structure. Consequently, a standing wave which concentrates energy on the first medium and a standing wave which concentrates energy on the second medium tend to become present relative to an electromagnetic wave of a polarized light component exhibiting oscillation of an electric field in the z-direction and the slanting direction. Since the degree of concentration of each energy is high, the band range of the complete photonic band gap is increased. As described above, in the present embodiment, the discrete structures having areas larger than the areas of the intersections of the columnar structures are disposed between the columnar structures and, thereby, the band range of the complete photonic band gap is increased. With respect to an electromagnetic wave of a polarized light component exhibiting oscillation of an electric field in the x direction or the y direction, a wide photonic band gap can be realized as in the known woodpile structure and the diamond woodpile structure. When the additional layer is composed of one layer containing discrete structures, as described above, the shapes of an x-z section and a y-z section are symmetric in order to reduce the direction dependence of the photonic band gap. Therefore, with respect to the shape of the discrete structure in an x-y plane, the length in the x axis direction is equal to the length in the y axis direction. In particular, the shape in the x-y plane is square in the case of a square column.

In the first embodiment shown in FIG. 1A, FIG. 1B, and FIG. 2, prisms are used as the columnar structures 101a, 103a, 105a, and 107a to realize the above-described effects. Alternatively, circular cylinders, elliptical cylinders, and polygonal prisms may be used. Rectangular parallelepipeds having planes containing the x axis and the y axis are used as the discrete structures 102a, 104a, 106a, and 108a. Alternatively, rectangular parallelepipeds, circular cylinders, elliptical cylinders, triangular prisms, and polygonal prisms having sectional shapes shown in FIGS. 4A to 4E, respectively, may be used. In addition, quadrangular prismoids, truncated cones, polygonal prismoids, and the like may be used, in which x-y sectional shapes vary in the layer.

Furthermore, the directions of disposition of each columnar structure is assumed to be the x axis or the y axis, and the two axes are orthogonal to each other. However, the angle between the two axes may be set at an angle other than 90 degrees. The interval of the prism structures parallel to the x axis and the interval of the prism structures parallel to the y axis may be set at different values. Such a configuration is particularly useful, for example, to realize a desired performance relative to the light incident at a predetermined angle and to introduce anisotropy in the structure. The media used for forming these structures are at least two types of media exhibiting a high refractive index ratio, as in known structures. Examples of media having high refractive indices include compound semiconductors, e.g., GaAs, InP, and GaN; semiconductors, e.g., Si; dielectrics, e.g., $TiO_2$; and metals. Examples of media having low refractive indices include dielectrics, e.g., $SiO_2$; organic polymer materials e.g., PMMA; and air. The photonic band gap of the photonic crystal results from the dielectric distribution in a photonic crystal, as described above. Consequently, a wider complete photonic band gap can be realized as media exhibiting larger ratio of dielectric constants with each other are combined. A desirable refractive index ratio to realize complete photonic band gap having an effective width is 2 or more. Furthermore, the columnar structures and the discrete structures are composed of the same medium, although may be composed of different media.

The relationship between the dielectric constant $\epsilon$ and the refractive index n is indicated by the following Formula (where $\mu$ represents a magnetic permeability).

$$n = \sqrt{(\epsilon \cdot \mu)} \qquad \text{Formula 3}$$

In the present embodiment, the basic configuration is composed of the first layer 101 to the eighth layer 108. However, an additional layer including at least one layer containing discrete structures may be disposed between the first layer 101 and the third layer 103, and the basic configuration may be composed of the three layers or at least three layers as a whole.

That is, a structure exhibiting a relatively wide complete photonic band gap can be realized even in the case where a first layer containing columnar structures disposed at predetermined intervals parallel to a first axis (y axis) and a second layer containing columnar structures disposed at predetermined intervals parallel to a second axis (x axis) are included, and an additional layer is disposed between the layers containing the columnar structures, the additional layer including at least one layer containing discrete structures disposed discretely at the positions corresponding to the intersections of the columnar structures in a plane including the first and the second axes, wherein regions other than the columnar structures in the first and the second layers and a region other than the discrete structures in the additional layer are filled in with a medium different from the medium constituting the columnar structures in the first and the second layers and the medium constituting the discrete structures in the additional layer.

The shift of the disposition pitch of the columnar structures in the first and the fifth layers 101 and 105 relative to the third and the seventh layers 103 and 107 can be substantially one-half the pitch P. The same holds true for the following embodiments.

Second Embodiment

Figure 5B:
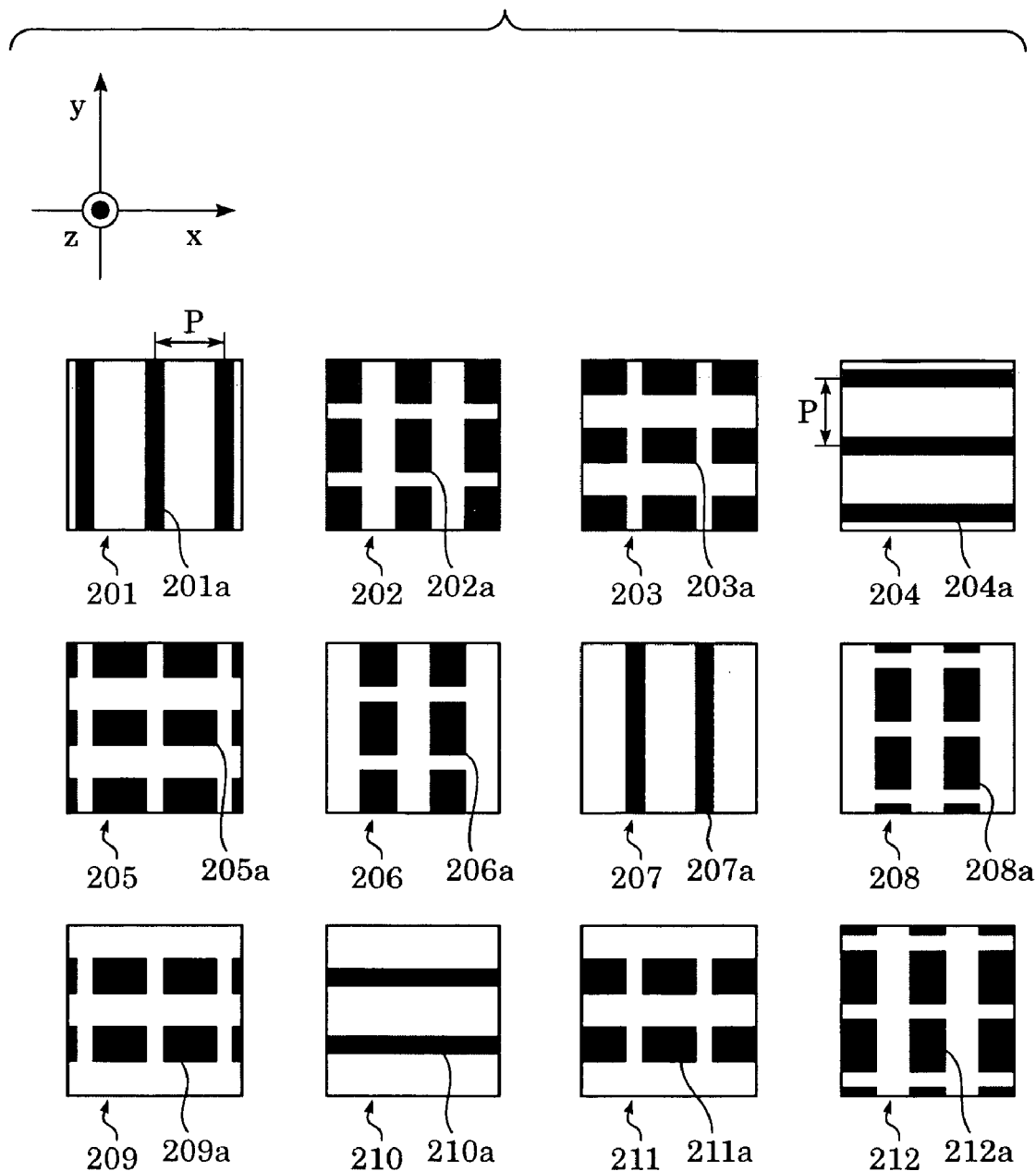
FIG. 5B is an x-y sectional view of each layer shown in FIG. 5A.

FIG. 5A is a perspective view of a key portion of a three-dimensional periodic structure 200 in accordance with a second embodiment of the present invention. The three-dimensional periodic structure 200 includes twelve layers 201 to 212 in x-y planes as a basic period. FIG. 5B shows a part of an x-y section of each layer. In the first layer 201 and the seventh layer 207, a plurality of columnar structures 201a and 207a, respectively, made of a first medium extending in the y axis direction are spaced at regular intervals P in the x direction. The columnar structures 201a and 207a are arranged at positions shifted from each other by P/2 in the x axis direction. In the fourth layer 204 and the tenth layer 210, a plurality of columnar structures 204a and 210a, respectively, made of the first medium extending in the x axis direction are spaced at regular intervals P in the y direction. The columnar structures 204a and 210a are arranged at positions shifted from each other by P/2 in the y axis direction. In the second layer 202 and the third layer 203, discrete structures 202a and 203a, respectively, made of the first medium are disposed discretely at positions corresponding to the intersections of the columnar structures 201a in the first layer 201 and the columnar structures 204a in the fourth layer 204 such that the discrete structures do not contact with each other in the x-y plane. The discrete structures 202a and the 203a are symmetric and they can coincide with each other by being rotated 90 degrees in an x-y plane. Likewise, in the fifth layer 205, the sixth layer 206, the eighth layer 208, the ninth layer 209, the eleventh layer 211, and the twelfth layer 212 disposed between the layers containing the columnar structures, discrete structures 205a, 206a, 208a, 209a, 211a, and 212a, respectively, made of the first medium are disposed discretely in x-y planes at positions corresponding to the intersections of the columnar structures in the adjacent layers. The columnar structures and the discrete structures in the adjacent layers are in contact with each other. In each layer, regions other than the columnar structures and the discrete structures are filled in with a second medium. The refractive indices of the first and the second media, shapes and intervals of the columnar structures and the discrete structures, the thickness of each layer, and the like are optimized such that a complete photonic band gap of a very wide frequency band (wavelength band) is realized in a desired frequency range (wavelength range).

Figure 6:
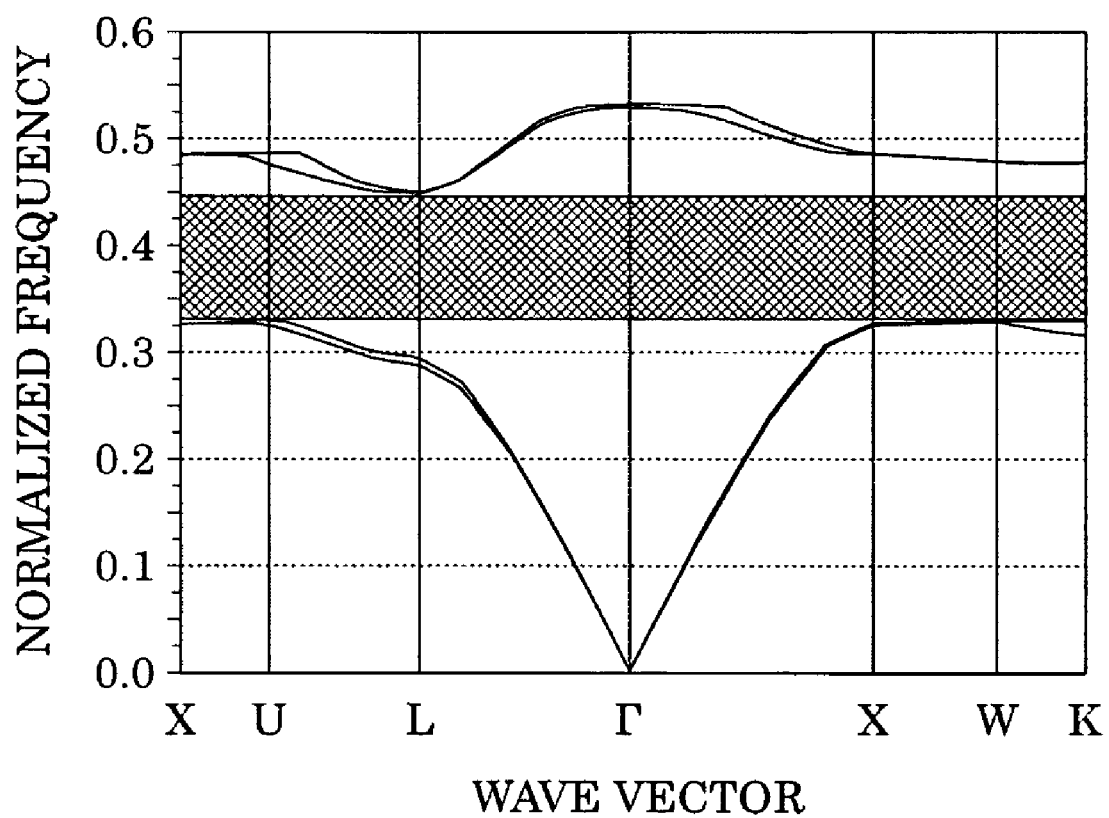
FIG. 6 is an explanatory diagram of a photonic band structure of the second embodiment of the present invention.

In the present embodiment, for example, FIG. 6 shows the result of analysis of a photonic band structure by using the plane-wave expansion method, where the refractive index of the first medium is assumed to be 4, the refractive index of the second medium is assumed to be 1, the interval of the columnar structures is assumed to be P, the thickness in the z axis direction of every layer containing the columnar structures is assumed to be 0.174×P, the thickness in the z axis direction of every layer containing the discrete structures is assumed to be 0.09×P, every columnar structure is assumed to be a square prism having a section side length of 0.174×P, and every discrete structure is assumed to be a rectangular parallelepiped having a thickness in the z axis direction of 0.09×P with a rectangular x-y section having side lengths of 0.655×P and 0.31×P.

The complete photonic band gap ratio of this three-dimensional periodic structure is about 0.303 and, therefore, a structure exhibiting a complete photonic band gap of a wide band width can be realized as compared with known woodpile structure and diamond woodpile structure for the same reason as in the first embodiment. Since the additional layers are composed of at least two layers containing the discrete structures, as described above, in particular, portions joined in a slanting direction (for example, a diagonal direction of x-z) are incorporated into the diamond woodpile structure. Consequently, a standing wave which concentrates energy on the first medium and a standing wave which concentrates energy on the second medium tend to become present relative to an electromagnetic wave of a polarized light component exhibiting oscillation of an electric field in the slanting direction. Since the degree of concentration of each energy is high, the band range of the complete photonic band gap is increased as compared with that in the case where the additional layer is composed of one layer. When the additional layers are composed of at least two layers, in order to reduce the direction dependence of the photonic band gap, it is desirable that the shapes of an x-z section and a y-z section are symmetric on an additional layer basis. With respect to the shape of the discrete structure contained in the additional layer in an x-y plane, the length in the x axis direction and the length in the y axis direction are not necessarily made equal to each other. The two lengths are made to have different values because the flexibility in design is increased and a wider photonic band gap can be realized. In particular, as is shown in the present embodiment, the length in the x axis direction is made longer than the length in the y axis direction in the shape of the discrete structure adjacent to the columnar structure extending in the x axis direction, and the length in the y axis direction is made longer than the length in the x axis direction in the shape of the discrete structure adjacent to the columnar structure extending in the y axis direction because a wider photonic band gap can be realized. In this manner, according to the present embodiment, a structure exhibiting a complete photonic band gap wider than that in the first embodiment can be realized.

As in the first embodiment, the columnar structures, the shapes of discrete structures, the directions and intervals of the columnar structures, and refractive indices of constituent media are not limited to those described above. The symmetry of the discrete structures in two additional layers disposed between the layers containing the columnar structures to coincide with each other by rotation is not limited to the case where the rotation angle is 90 degrees. Furthermore, the discrete structures may not coincide by rotation.

The two discrete structures in the additional layer disposed between the layers containing the columnar structures may have different areas in the x-y plane. For example, the additional layer may be composed of a layer containing two discrete structures having areas changing sequentially in the z direction.

In the three-dimensional periodic structure 200 shown in FIG. 5A, when the refractive index of the first medium is assumed to be about 2.33, the refractive index of the second medium is assumed to be about 1.0, the interval of the columnar structures is assumed to be P, the thickness in the z axis direction of every layer containing the columnar structures is assumed to be 0.174×P, the thickness in the z axis direction of every layer containing the discrete structures is assumed to be 0.09×P, every columnar structure is assumed to be a rectangular prism having a section side length of 0.31×P, every discrete structure is assumed to be a rectangular parallelepiped having a thickness in the z axis direction of 0.09×P with a rectangular x-y section having side lengths of 0.66×P and 0.37×P, and the photonic band structure is analyzed by the plane-wave expansion method, the complete photonic band gap ratio is about 0.088.

When a woodpile structure according to a known technology is formed by using similar media (the refractive index of the square column is 2.33, and the refractive index of the portion other than the square column is 1.0), the complete photonic band gap is 0.059. Therefore, it is clear that the structure according to the present invention exhibits a complete photonic band gap of wide band width as compared with that of the woodpile structure even when the ratio of the refractive index of the first medium to the refractive index of the second medium is reduced. In the woodpile structure used for the comparison, the width L1 and the height L2 in the z direction of the square column are assumed to be those represented by Formula 1, where the interval between the square columns in each layer is assumed to be P. Furthermore, when a diamond woodpile structure according to a known technology is formed by using similar media (the refractive index of the square column is 2.33, and the refractive index of the portion other than the square column is 1.0), the complete photonic band gap is 0.065. Therefore, it is clear that the structure according to the present invention exhibits a complete photonic band gap of wide band width as compared with that of the diamond woodpile structure even when the ratio of the refractive index of the first medium to the refractive index of the second medium is reduced.

In a three-dimensional periodic structure having the same shape as in the present embodiment, when the refractive index of a medium constituting the columnar structure is assumed to be about 2.33, the refractive index of a medium constituting the discrete structure is assumed to be about 3.0, and the refractive index of a medium constituting the portions other than the columnar structures and the discrete structures is assumed to be about 1.0, the complete photonic band gap ratio is about 0.129. Therefore, even when the three-dimensional periodic structure has the same shape, a structure exhibiting a complete photonic band gap of wider band width can be realized by forming the discrete structures in the additional layer from a medium having a high refractive index. Even in the case where the additional layer is composed of a plurality of layers and discrete structures contained in part of the above-described layers are formed from a medium having a high refractive index, a structure exhibiting a complete photonic band gap of wide band width can be realized.

Third Embodiment

Figure 7A:
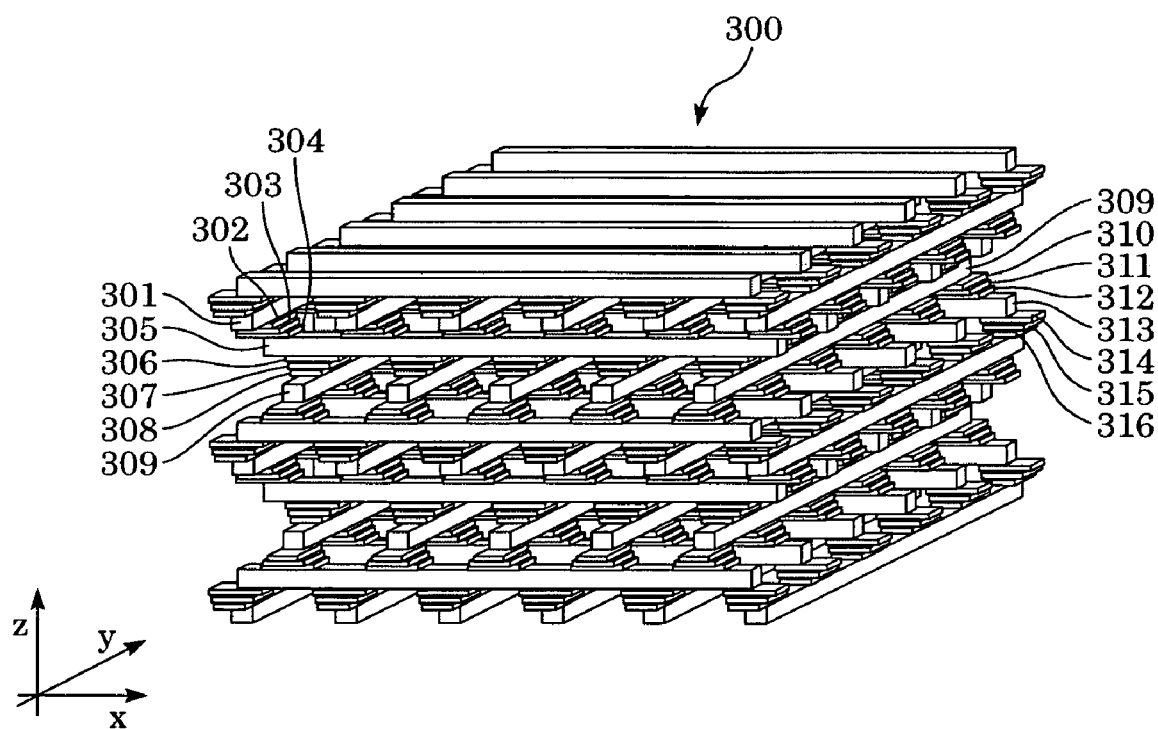
FIG. 7A is a perspective view of a key portion of a third embodiment of the present invention.
Figure 7B:
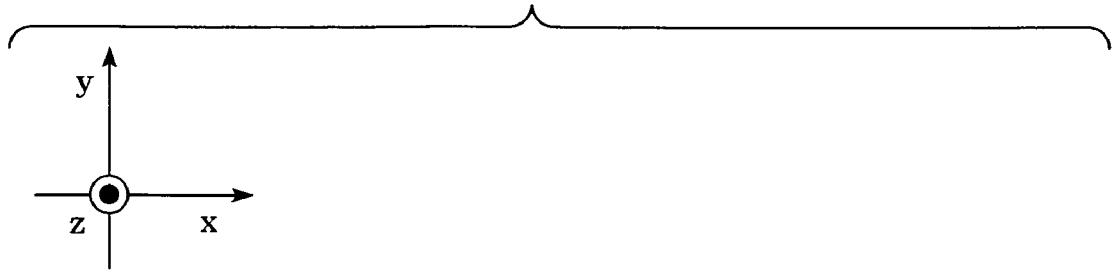
FIG. 7B is an x-y sectional view of each layer shown in FIG. 7A.
Figure 7B:
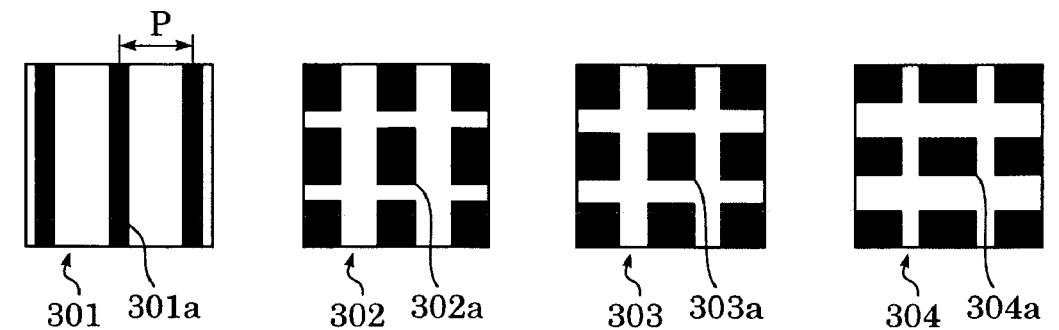
Figure 7B:
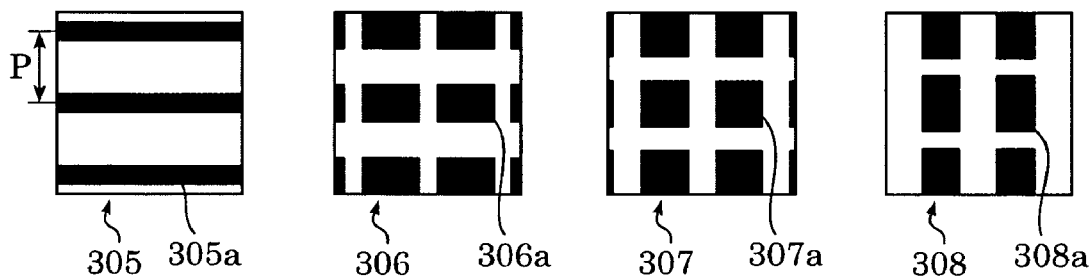
Figure 7B:
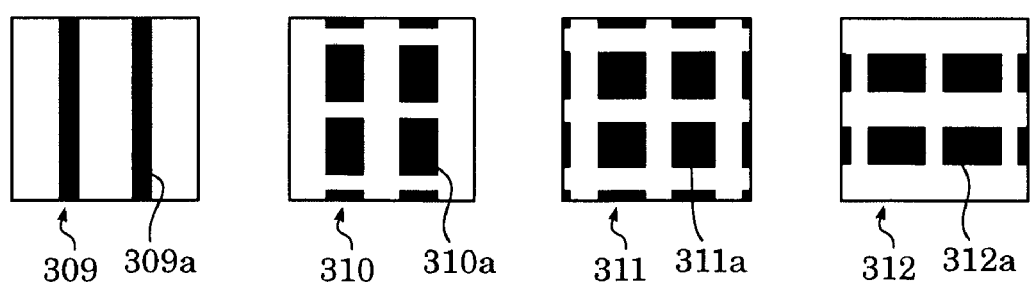
Figure 7B:
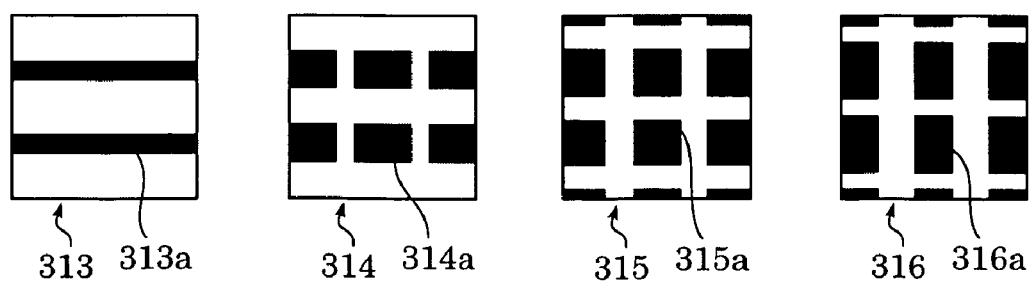

FIG. 7A is a perspective view of a key portion of a three-dimensional periodic structure 300 in accordance with a third embodiment of the present invention. The three-dimensional periodic structure 300 includes sixteen layers 301 to 316 in x-y planes as a basic period. FIG. 7B shows a part of an x-y section of each layer. In the first layer 301 and the ninth layer 309, a plurality of columnar structures 301a and 309a, respectively, made of a first medium extending in the y axis direction are spaced at regular intervals P in the x direction, and the columnar structures 301a and 309a are arranged at positions shifted from each other by P/2 in the x axis direction.

In the fifth layer 305 and the thirteenth layer 313, a plurality of columnar structures 305a and 313a, respectively, made of the first medium extending in the x axis direction are spaced at regular intervals P in the y direction, and the columnar structures 305a and 313a are arranged at positions shifted from each other by P/2 in the y axis direction. In the second layer 302, the third layer 303, and the fourth layer 304, discrete structures 302a, 303a, and 304a, respectively, made of the first medium are disposed discretely at positions corresponding to the intersections of the columnar structures 301a in the first layer 301 and the columnar structures 305a in the fifth layer 305 such that the discrete structures do not contact with each other in the x-y plane.

The discrete structures 302a and the 304a are symmetric and they can coincide with each other by being rotated 90 degrees in an x-y plane. Likewise, in the sixth layer 306, the seventh layer 307, the eighth layer 308, the tenth layer 310, the eleventh layer 311, the twelfth layer 312, the fourteenth layer 314, the fifteenth layer 315, and the sixteenth layer 316 disposed between the layers containing the columnar structures, discrete structures 306a, 307a, 308a, 310a, 311a, 312a, 314a, 315a, and 316a made of the first medium are disposed discretely in x-y planes at positions corresponding to the intersections of the columnar structures in the adjacent layers. The columnar structures and the discrete structures in the adjacent layers are in contact with each other. In each layer, regions other than the columnar structures and the discrete structures are filled in with a second medium. The refractive indices of the first and the second media, shapes and intervals of the columnar structures and the discrete structures, the thickness of each layer, and the like are optimized such that a complete photonic band gap of a very wide frequency band (wavelength band) can be realized in a desired frequency range (wavelength range).

Figure 8:
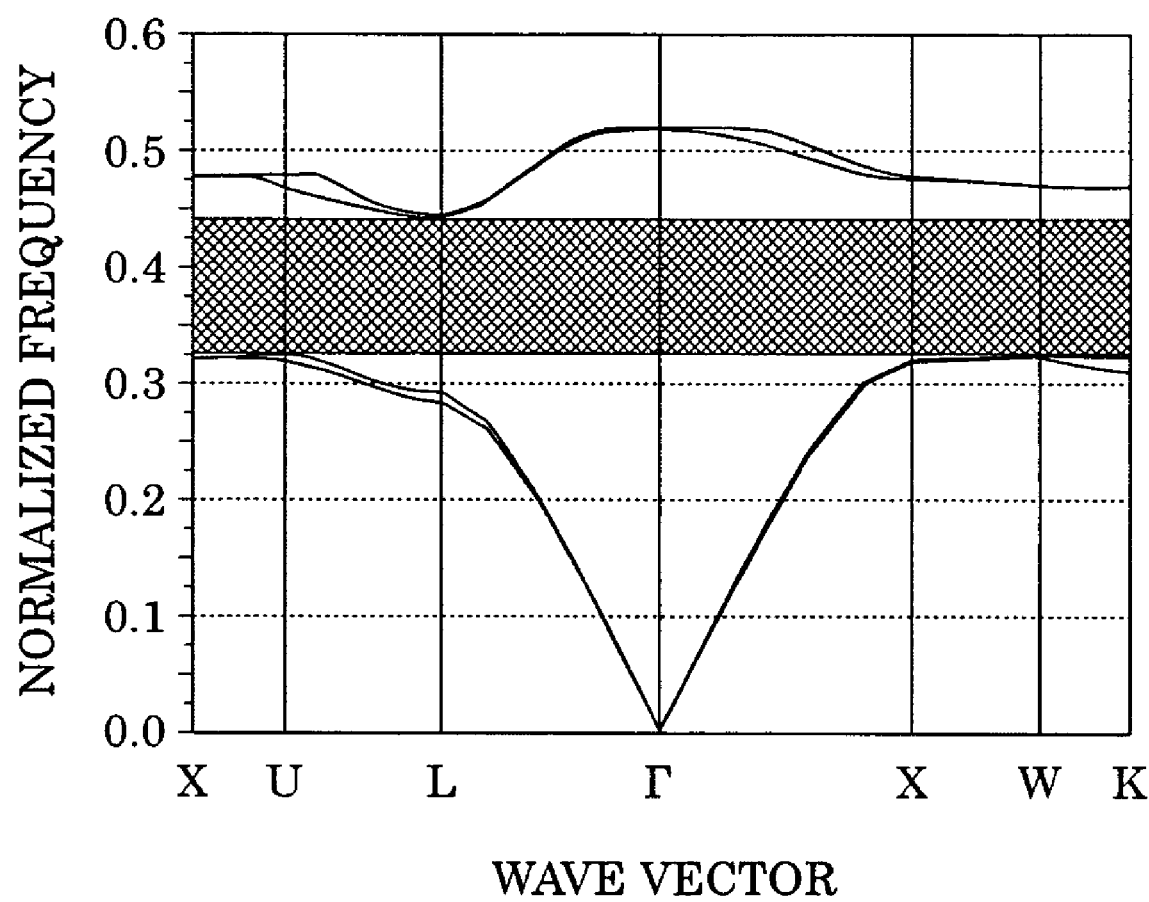
FIG. 8 is an explanatory diagram of a photonic band structure of the third embodiment of the present invention.

For example, FIG. 8 shows the result of analysis of a photonic band structure by using the plane-wave expansion method, where the refractive index of the first medium is assumed to be 4, the refractive index of the second medium is assumed to be 1, the interval of the columnar structures is assumed to be P, the thickness in the z axis direction of every layer containing the columnar structures is assumed to be 0.174×P, the thickness in the z axis direction of every layer containing the discrete structures is assumed to be 0.06×P, every columnar structure is assumed to be a rectangular prism having a section side length of 0.174×P in the z direction and 0.22×P in the x or y direction, and discrete structures are assumed to be a rectangular parallelepiped having a thickness in the z axis direction of 0.06×P with a rectangular x-y section having side lengths of 0.28×P and 0.66×P and a rectangular parallelepiped having a thickness in the z axis direction of 0.06×P with a square x-y section having a side length of 0.43×P. The complete photonic band gap ratio of this structure is about 0.307 and, therefore, a structure exhibiting a complete photonic band gap of wide band width can be realized as compared with the known woodpile structure and the diamond woodpile structure for the same reason as in the second embodiment. According to the present embodiment, a structure exhibiting a complete photonic band gap of wider band range can be realized as compared with those in the first embodiment and the second embodiment.

As in the first embodiment, the columnar structures, the shapes of discrete structures, the direction and the interval of the columnar structures, and refractive indices of constituent media are not limited to those described above. The symmetry of the discrete structures in three additional layers disposed between the layers containing the columnar structures to coincide with each other by rotation is not limited to the case where the rotation angle is 90 degrees. Furthermore, the discrete structures may not coincide by rotation. The thicknesses of all the additional layers may not be the same.

The three discrete structures in the additional layer disposed between the layers containing the columnar structures may have different areas in the x-y plane. For example, the additional layer may be composed of three layers containing discrete structures having areas changing sequentially in the z direction.

In order to realize a wider complete photonic band gap, it is better that layers containing the discrete structures are at least four layers. However, the formation process is complicated. Therefore, the structure may be selected in accordance with the purpose.

As described above, layers containing the discrete structures disposed discretely are provided between the layers containing columnar structures parallel spaced at an interval and, thereby, a complete photonic band gap wider than that in the known structure can be realized.

Fourth Embodiment

The fourth embodiment related to a functional element including the three-dimensional periodic structure of the present invention will be described. FIGS. 9A and 9B are sectional views of functional elements having waveguides 400, wherein linear defects are disposed in the three-dimensional periodic structures of the present invention. In the present embodiment, by providing the linear defect, a state in which an electromagnetic wave is present in only the defect portion can be brought about relative to the electromagnetic wave in a wavelength range that is a part of the wavelength range in the photonic band gap of the periodic structure. Consequently, a waveguide capable of realizing a sharp bending angle with low loss is constructed. FIG. 9A is a sectional view of a functional element in which the columnar structures are removed from a predetermined region of the three-dimensional periodic structure of the present invention to construct a linear waveguide. FIG. 9B is a sectional view of a functional element in which the columnar structures and the discrete structures are removed from a predetermined region of the three-dimensional periodic structure of the present invention to construct a curved waveguide. The linear defect is formed by removing or shifting the location of the columnar structure portions, the discrete structure portions, or both structure portions in order that the waveguide has a desired performance, e.g., a waveguide wavelength range. Since the periodic structure portion serving as a base has a wide photonic band gap range, a waveguide which is operated in a wavelength band wider than that of the waveguide having a known structure can be thereby realized.

Figure 10:
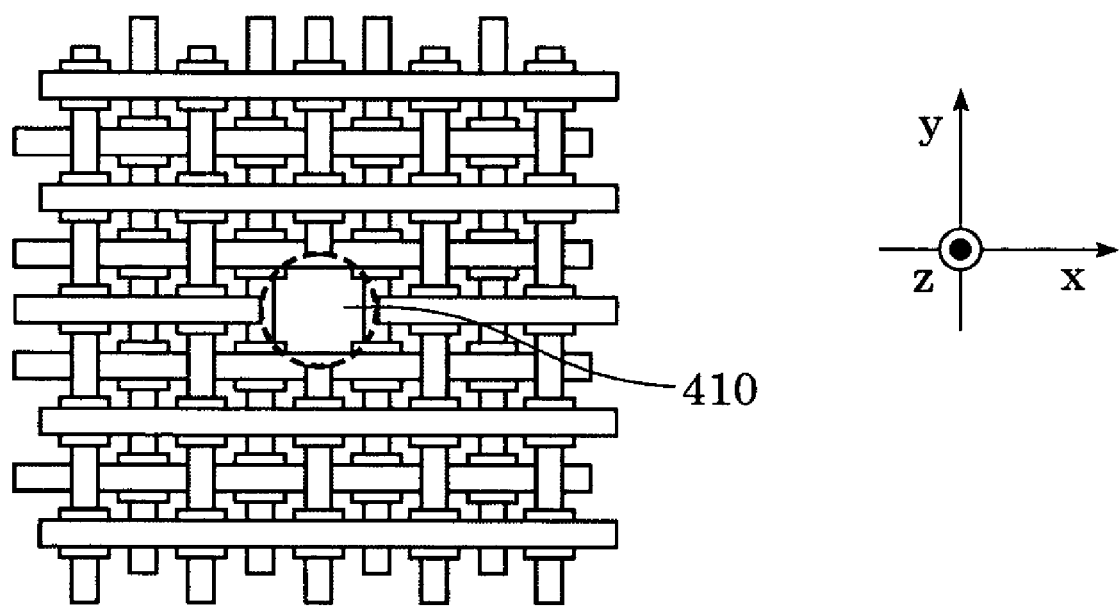
FIG. 10 is a schematic diagram of a key portion of the fourth embodiment of the present invention.
Figure 12A:
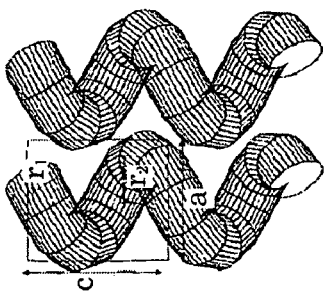
FIGS. 12A to 12F are diagrams of conventional three-dimensional periodic structures exhibiting photonic band gaps.
Figure 12B:
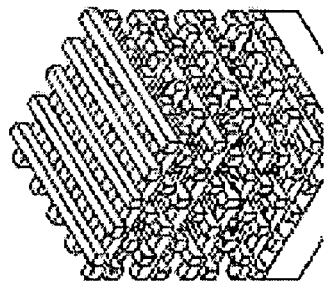
Figure 12D:
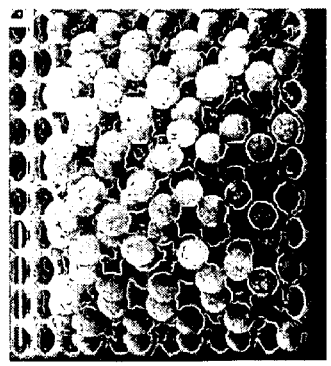
Figure 12C:
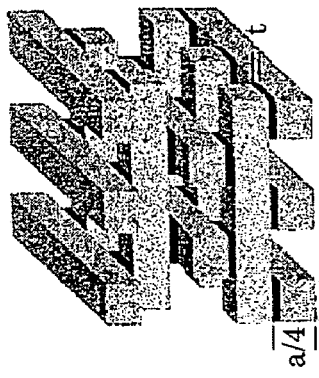
Figure 12E:
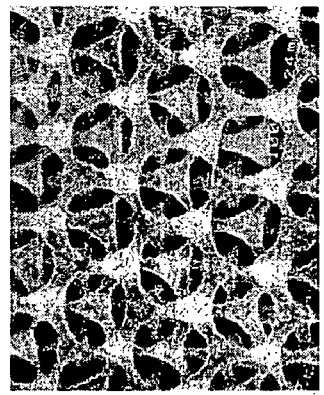
Figure 12F:
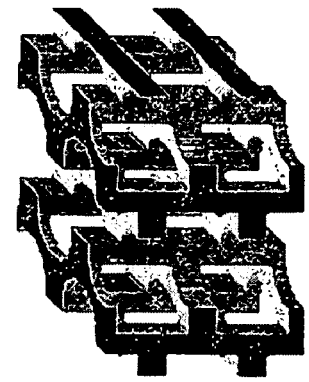

FIG. 10 is a sectional view of a resonator 410 in which a point defect is provided in the three-dimensional periodic structure of the present invention. In the present embodiment shown in FIG. 10, by providing the point defect, a state in which an electromagnetic wave can be present in only the defect portion can be brought about relative to the electromagnetic wave in a wavelength range that is a part of the wavelength range in the photonic band gap of the periodic structure. Consequently, a high-performance resonator capable of confining the electromagnetic wave in a very small region and exhibiting a high confining effect is constructed. By using this resonator, for example, a wavelength selection filter to take out an electromagnetic wave in a very narrow wavelength range corresponding to the resonant wavelength of the resonator from the incident light can be realized. The point defect is formed by removing or shifting the location of the columnar structures, the discrete structures, or both structure portions in order that the resonator has a desired performance, e.g., a selection wavelength. Since the periodic structure portion serving as a base has a wide photonic band gap range, a resonator which is operated in a wavelength band wider than that of the resonator having a known structure can be thereby realized.

In the present embodiment, the resonator shown in FIG. 10 is filled in with an active medium, energy is supplied by an electromagnetic wave or a current from the outside of the resonator and, thereby, very high-efficiency light-emitting devices, e.g., lasers and LEDs, are realized. As an active medium, various materials, e.g., compound semiconductor, inorganic light-emitting material, organic light-emitting material, polymer light-emitting material, quantum dot and nanocrystal, are used. For example, the light-emitting device can be used as a light source for optical communication by bringing the resonant wavelength of the above-described resonator into correspondence with an infrared optical communication spectrum band (800 nm to 1,800 nm). By bringing the resonator into correspondence with the primary colors of light, red (R), green (G), and blue (B), the light-emitting device can be used as light sources for image display devices, and be used as pickup light sources for optical disks, e.g., CDs and DVDs. Furthermore, high-performance microcircuits can be realized by combining various functional elements, e.g., the waveguides shown in FIGS. 9A and 9B, the resonator shown in FIG. 10, light-emitting devices, and polarizing elements through the use of dispersion abnormality in the photonic band. In the embodiments shown in FIG. 9A, FIG. 9B, and FIG. 10, the periodic structure shown in FIGS. 1A and 1B is used as a basic structure. However, the structure shown in FIGS. 5A and 5B, the structure shown in FIGS. 7A and 7B, or other three-dimensional periodic structures may be used.

As described above, layers containing the discrete structures disposed discretely are provided between the layers containing columnar structures parallel spaced at an interval and, thereby, a complete photonic band gap wider than that in the known structure can be realized. Consequently, a functional element which is operated in a wider wavelength band can be realized by constructing the functional element including the three-dimensional periodic structure of the present invention.

Fifth Embodiment

A method for producing a three-dimensional periodic structure according to the fifth embodiment of the present invention will be described below with reference to FIG. 11. Although a method for producing the periodic structure shown in FIGS. 1A and 1B will be described in FIG. 11, the structure shown in FIGS. 5A and 5B and the structure shown in FIGS. 7A and 7B can be produced in a similar manner.

As shown in FIGS. 11A and 11B, a layer having a two-dimensional periodic structure 510 is formed on a substrate 501, wherein columnar structures 511 made of a first medium extending in the y axis direction are spaced at intervals P, and regions 512 other than the columnar structures 511 are filled in with a second medium.

A method similar to a known process for producing a semiconductor can be used for forming the layer containing a plurality of regions as described above, the process including each step of lithography, deposition method, epitaxial growth, and etching.

As shown in FIGS. 11C and 11D, a layer having a two-dimensional periodic structure 520 is formed, wherein discrete structures 521 made of the first medium are spaced at intervals P in the x and y directions, and a region 522 other than the discrete structures 521 is filled in with the second medium.

As shown in FIGS. 11E and 11F, a layer having a two-dimensional periodic structure 530 is formed, wherein columnar structures 531 made of the first medium extending in the x axis direction are spaced at intervals P, and regions 532 other than the columnar structures 531 are filled in with the second medium.

As shown in FIGS. 11G and 11H, a layer having a two-dimensional periodic structure 540 is formed, wherein discrete structures 541 made of the first medium are spaced at intervals P in the x and y directions, and a region 542 other than the discrete structures 541 is filled in with the second medium.

As shown in FIGS. 11I and 11J, a layer having a two-dimensional periodic structure 550 is formed, wherein columnar structures 551 made of the first medium extending in the y axis direction are spaced at intervals P and arranged at positions shifted from the columnar structures 511 by P/2 in the x axis direction, and regions 552 other than the columnar structures 551 are filled in with the second medium.

As described above, the layer having the two-dimensional structure containing the columnar structures and the layer having the two-dimensional structure containing the discrete structures are formed alternately and, thereby, a basic period of the three-dimensional periodic structure shown in FIG. 11K is produced. Furthermore, the present steps are repeated and, thereby, the three-dimensional periodic structure exhibiting a wide complete photonic band gap shown in FIG. 1A is produced. The two-dimensional periodic structure can be produced by an interference exposure method, a nanoimprinting method, a method through the use of a multiphoton absorption process by ultrashort pulsed light, and a method through the use of photolithography, e.g., electron beam exposure or near-field exposure, and stacking is performed by a wafer bonding and the like to produce the three-dimensional periodic structure.

In the case where the second medium is air, the above-described three-dimensional periodic structure can be produced by using a substance capable of being removed by dissolution selectively of the first medium and, thereafter, the portion corresponding to the second medium can be removed by dissolution.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-046454 filed Feb. 23, 2004, Japanese Patent Application No. 2004-217365 filed Jul. 26, 2004, and Japanese Patent Application No. 2005-016792 filed Jan. 25, 2005, which are hereby incorporated by reference herein.

What is claimed is:

1. A three-dimensional periodic structure exhibiting a photonic band gap comprising:
   a first layer including a plurality of columnar structures spaced apart by a predetermined interval;
   a second layer including a plurality of columnar structures spaced apart by a predetermined interval, the columnar structures extending in a direction different from that of the columnar structures in the first layer;
   a third layer including a plurality of columnar structures spaced apart by a predetermined interval, the columnar structures extending in the same direction as that of the columnar structures in the first layer;
   a fourth layer including a plurality of columnar structures spaced apart by a predetermined interval, the columnar structures extending in the same direction as that of the columnar structures in the second layer;
   and additional layers, each including one layer containing discrete structures disposed discretely in a plane parallel to each of the four layers,
   wherein the first layer to the fourth layer are stacked sequentially with the additional layer between the individual layers,
   the first layer and the third layer are stacked such that the columnar structures contained in the two layers mutually shift by one-half the predetermined interval in a direction perpendicular to the direction of the extension of the columnar structures,
   the second layer and the fourth layer are stacked such that the columnar structures contained in the two layers mutually shift by one-half the predetermined interval in a direction perpendicular to the direction of the extension of the columnar structures,
   discrete structures contained in the additional layers are disposed at the positions corresponding to the intersections of the columnar structures, and
   an area of the discrete structure in the plane parallel to each of the four layers is larger than an area of the intersection of the columnar structures.

2. A three-dimensional periodic structure exhibiting a photonic band gap comprising:
   a first layer including a plurality of columnar structures spaced apart by a predetermined interval;
   a second layer including a plurality of columnar structures spaced apart by a predetermined interval, the columnar structures extending in a direction different from that of the columnar structures in the first layer;
   a third layer including a plurality of columnar structures spaced apart by a predetermined interval, the columnar structures extending in the same direction as that of the columnar structures in the first layer;
   a fourth layer including a plurality of columnar structures spaced apart by a predetermined interval, the columnar structures extending in the same direction as that of the columnar structures in the second layer;
   and additional layers, each including at least two layers containing discrete structures disposed discretely in a plane parallel to each of the four layers,
   wherein the first layer to the fourth layer are stacked sequentially with the additional layer between the individual layers,
   the first layer and the third layer are stacked such that the columnar structures contained in the two layers mutually shift by one-half the predetermined interval in a direction perpendicular to the direction of the extension of the columnar structures,
   the second layer and the fourth layer are stacked such that the columnar structures contained in the two layers mutually shift by one-half the predetermined interval in a direction perpendicular to the direction of the extension of the columnar structures, and
   discrete structures contained in the additional layers are disposed at the positions corresponding to the intersections of the columnar structures.

3. The three-dimensional periodic structure according to claim 2, wherein an area of the discrete structure in the plane parallel to each of the four layers is larger than an area of the intersection of the columnar structures.

4. The three-dimensional periodic structure according to claim 1, wherein the additional layer includes a layer containing discrete structures having a length in the direction of extension of the columnar structures contained in the first layer equal to a length in the direction of extension of the columnar structures contained in the second layer, in the plane parallel to each of the four layers.

5. The three-dimensional periodic structure according to claim 2 or claim 3, wherein the additional layer includes a layer containing discrete structures having a length in the direction of extension of the columnar structures contained in the first layer different from a length in the direction of extension of the columnar structures contained in the second layer, while the length in the direction of extension of the columnar structures contained in the columnar-structure-containing layer adjacent to the layer containing the discrete structures is longer than the length in the other direction, in the plane parallel to each of the four layers.

6. The three-dimensional periodic structure according to any one of claim 1 to claim 3, wherein a medium constituting the columnar structures and a medium constituting the discrete structures contained in the additional layer have the same refractive index.

7. The three-dimensional periodic structure according to any one of claim 1 to claim 3, wherein the additional layer includes at least one layer containing discrete structures composed of a medium having a refractive index different from that of a medium constituting the columnar structures.

8. The three-dimensional periodic structure according to claim 7, wherein all media constituting discrete structures contained in the additional layer are composed of media having the same refractive index.

9. The three-dimensional periodic structure according to claim 7, wherein the medium constituting the discrete structures contained in the additional layer has a refractive index higher than the refractive index of the medium constituting the columnar structures.

10. The three-dimensional periodic structure according to any one of claim 1 to claim 3, wherein the angle between the direction of extension of the columnar structures contained in the first layer and the direction of extension of the columnar structures contained in the second layer is 90 degrees.

11. A functional element comprising a structure in which a plurality of three-dimensional periodic structures according to any one of claim 1 to claim 3 are stacked, wherein the structure comprises a linear defect portion, and the linear defect portion functions as a waveguide.

12. A functional element comprising a structure in which a plurality of three-dimensional periodic structures according to any one of claim 1 to claim 3 are stacked, wherein the structure comprises a point defect portion, and the point defect portion functions as a resonator.

13. A light-emitting device comprising the functional element according to claim 12 containing an active medium in the point defect portion and an excitation mean to excite the active medium, the active medium exhibiting a light emission.

14. The light-emitting device according to claim 13, wherein the light-emitting device is a laser.

* * * * *

UNITED STATES PATENT AND TRADEMARK OFFICE
CERTIFICATE OF CORRECTION

PATENT NO. : 6,993,235 B2  
DATED : January 31, 2006  
INVENTOR(S) : Akinari Takagi, Kiyokatsu Ikemoto and Hikaru Hoshi Page 1 of 1

It is certified that error appears in the above-identified patent and that said Letters Patent is hereby corrected as shown below:

<u>Column 8,</u>  
Lines 7-8, " $n = \overline{\sqrt{(\epsilon \cdot)}}$ " should read -- $n = \sqrt{(\epsilon \cdot \mu)}$ --.

Signed and Sealed this

Sixth Day of June, 2006

JON W. DUDAS  
*Director of the United States Patent and Trademark Office*